US006668620B2

United States Patent
Pond et al.

(10) Patent No.: US 6,668,620 B2
(45) Date of Patent: Dec. 30, 2003

(54) TEST FOR HYDRAULIC LEAKAGE

(75) Inventors: Mark R. Pond, Romeoville, IL (US);
Justin E. Arney, Muskego, WI (US);
George T. Fiala, Racine, WI (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 10/034,405

(22) Filed: Dec. 28, 2001

(65) Prior Publication Data
US 2003/0121314 A1 Jul. 3, 2003

(51) Int. Cl.$^7$ .............................. G01M 3/08; G01M 3/04
(52) U.S. Cl. ............................ 73/46; 73/40; 73/40.5 R
(58) Field of Search ............................ 73/46, 47, 48, 73/49.8, 40, 40.5 R

(56) References Cited

U.S. PATENT DOCUMENTS

| 3,987,664 A | * | 10/1976 | Hass et al. ................... 73/49.2 |
| 4,428,228 A | * | 1/1984 | Banzhaf et al. ............ 73/119 A |
| 4,599,890 A | * | 7/1986 | Girone et al. ................... 73/37 |
| 5,052,212 A | * | 10/1991 | Cohrs ........................... 73/1.17 |
| 5,637,789 A | * | 6/1997 | Lawson ..................... 73/40.5 R |

FOREIGN PATENT DOCUMENTS

| JP | 2259439 A | * | 10/1990 | ..................... 73/46 |

* cited by examiner

Primary Examiner—Michael Cygan
(74) Attorney, Agent, or Firm—John William Stader; Collin A. Webb; Rebecca L. Henkel

(57) ABSTRACT

A test for hydraulic leakage in hydraulic components uses a rate testing device having two circuits including a filling circuit that fast-fills the component with hydraulic fluid and a leakage circuit that measures the leakage rate of fluid flow through the component. The filling circuit is first connected to the component to fill the component. Once full, flow through the filling circuit is blocked and flow to the component is provided by the leakage circuit, which includes a leakage flow rate measuring device. The filling circuit provides a flow rate that is at least twice the flow rate that is provided by the leakage circuit.

5 Claims, 2 Drawing Sheets

TEST FOR HYDRAULIC LEAKAGE

FIELD OF THE INVENTION

This invention relates generally to hydraulic test equipment. More particularly, it relates to a method of using hydraulic test equipment to measure hydraulic leaks in hydraulic valves and assemblies.

BACKGROUND OF THE INVENTION

Hydraulic valves and other hydraulic equipment typically include several closely fitting individual mechanical parts that regulate the flow of hydraulic fluid. By opening and closing internal passages formed therebetween, these parts regulate hydraulic fluid flow in a manner that provides the specific functions the operator desires.

Since these components are mechanical, however, and since fluid under pressure is applied to them, they always exhibit a certain amount of leakage through the gaps between the internal components. Eliminating all leakage in hydraulic components would require extremely tight tolerances between the mechanical parts between which hydraulic fluid would otherwise leak. These tolerances would make virtually every hydraulic component extremely expensive.

For this reason, the design tolerances for hydraulic components are increased with the understanding that there will be some residual. Even so, excessive leakage, i.e. that beyond the design limits, is not tolerated.

For this reason, hydraulic components are typically designed to have a specified maximum hydraulic fluid leakage rate to be measured under predetermined conditions. The leakage flow rate is a tolerance like any of the dimensional tolerances of the mechanical components making up the hydraulic device.

The leakage rate itself is a function of the mechanical interaction of all the components making up the hydraulic device. It is the spaces between each of the mechanical components that cause leakage. For this reason, the leakage rate can only be measured and the hydraulic components can only be determined to have passed or failed their leakage rate specifications after they are completely assembled. Traditionally, assembled hydraulic components are received at the test stand dry, i.e. (not pre-filled with hydraulic fluid) from the manufacturing process. They are then filled with hydraulic fluid, heated to an operating temperature (if that is part of the specification), are pressurized by hydraulic fluid at a specified testing pressure, and the minute leakage rates of hydraulic fluid is then measured.

The leakage flow rate is typically a tiny fraction of the components' rated flow rate capacity. For example, a valve that provides a maximum fluid flow in operation of a gallon or more per minute may have a maximum permitted flow rate of only a few cubic centimeters of fluid per minute. In addition, the internal volume of the device—the volume that must be filled with hydraulic fluid to purge all air—may be substantial as well.

At the same time, the leakage fluid flow rate measuring devices typically have a very small flow rate. A device intended to measure a maximum leakage flow rate of ten cubic centimeters per minute may have a maximum flow rate of perhaps twenty cubic centimeters per minute. This is primarily due to the small size, compact construction, and fragile nature of these precision measurement devices.

In a typical prior art test stand, a source of hydraulic fluid pressure is provided that is connected to the leakage flow rate measuring device, which is in turn connected to one of the ports of the hydraulic component that is to be tested. The hydraulic fluid source forces fluid through the measuring device and into the dry, just-assembled hydraulic component.

During the initial phase of this process, the quantity of fluid forced through the measuring device into the hydraulic component is quite high as the air inside the empty hydraulic component being tested is forced out. Once all of the air is forced out and the hydraulic component being tested is filled with hydraulic fluid, the actual leakage rate can be measured. This initial filling process often generates extremely high flow rates. Since the components are typically dry, there is no fluidic resistance to the initial inrush of fluid as the air is forced out. Air can be expelled through the air-filled gaps between the internal structures of a hydraulic component at an extremely high rate when pushed by the high pressure (typically around 1000 psi) of the hydraulic source.

There are significant problems in these prior art systems. First, since the measuring devices can only accommodate a tiny flow rate of hydraulic fluid, the maximum rate at which the hydraulic component can be filled during the initial phase is small. For a simple single spool bi-directional hydraulic control valve with pressure relief inserts and several check valves, this initial purging process can take as much as thirty or forty seconds. Again, this is because the flow rate through the measuring device must be severely limited to prevent damage to the device, or is inherently limited due to flow restrictions built into the measuring device. Since there is virtually no internal resistance to hydraulic fluid flow as the air is expelled from the hydraulic component being tested, however, the traditional test stands can produce very high fluid flow rates that can damage the leakage flow rate measuring device unless the flow through the measuring device is restricted. Restricting the flow through the measuring device, however, will unduly lengthen the filling time of the hydraulic component under test Once the hydraulic component is filled, however, the leakage flow rate can be virtually instantaneously measured. Typically, only 1–3 seconds are needed for the leakage flow rate to stabilize and for the operator to take an accurate measurement of that flow rate. Thus, perhaps 90% of the time required to check the leakage flow rate of the hydraulic component being tested is due to the lengthy period required to fill the hydraulic component and purge it of all air. One way to avoid this problem is to replace the low-capacity measuring device with a high-capacity measuring device and to provide virtually unlimited flow into the hydraulic component during the initial fill process. In this manner, the leakage flow rate measuring device will accommodate the very high filling flow rate during the period in which the hydraulic component is being filled.

As might be expected, however, measuring devices able to accommodate much higher flow rates without being damaged typically have much lower resolution and therefore reduced accuracy of measurement. For example, a flow rate measuring device that can accommodate a high flow rate of 1 gallon per minute during the initially filling process will typically provide a corresponding flow rate measurement resolution of 10 cc per minute. For most components, this resolution is too large to accurately measure a leakage flow rate once the device is filled.

What is needed, therefore, is a test stand for testing hydraulic leakage flow rates of hydraulic components that combines the accuracy of a low flow rate hydraulic flow measuring device with a high flow rate initial fill and purging system. It is an object of this invention to provide such a test stand.

SUMMARY OF THE INVENTION

In accordance with the first embodiment of the invention, a hydraulic leakage rate testing system for testing and to test the leakage flow of hydraulic components is provided that includes a source of hydraulic fluid, a hydraulic coupler communicating with the source, a measuring circuit with a flow rate measuring device in communication with both the source and the coupler and a by-pass circuit that is in communication with both the source and the coupler. The measuring circuit and by-pass circuit are preferably connected in parallel to provide parallel flow paths between the source and the coupler. The measuring circuit preferably includes a valve that blocks fluid flow between the source and the coupler through the measuring device when the valve is closed and permits flow between the source and the coupler through the device when the valve is open. The measuring circuit also preferably includes an orifice disposed to restrict the flow through the measuring device. The measuring circuit may also include a pressure relief valve located to limit the maximum hydraulic pressure applied by this source to the measuring device. The pressure relief valve is preferably located between the measuring device and the source in the measuring circuit. Another valve may be provided to block hydraulic fluid flow provided by the source from passing through both the measuring circuit and the by-pass circuit. An electronic controller may be coupled to the valve in the measuring circuit and the valve in the by-pass circuit to block or permit the flow alternatively through either circuit in accordance with the stored digital program in the controller that opens and closes the valves in the by-pass circuit. The electronic controller may also be coupled to the measuring device to receive an electrical signal from the measuring device indicative of a flow rate through that device. The electronic controller may be configured to open the valve in the by-pass circuit long enough to fill the hydraulic component through the by-pass circuit. The electronic controller may be configured to close the valve in the by-pass circuit after the component is filled.

BRIEF DESCRIPTION OF THE DRAWINGS

The present invention will become more fully understood from the following detailed description, taken in conjunction with the accompanying drawings, wherein like reference numerals refer to like parts, in which.

DETAILED DESCRIPTION OF THE INVENTION

Figure 1:
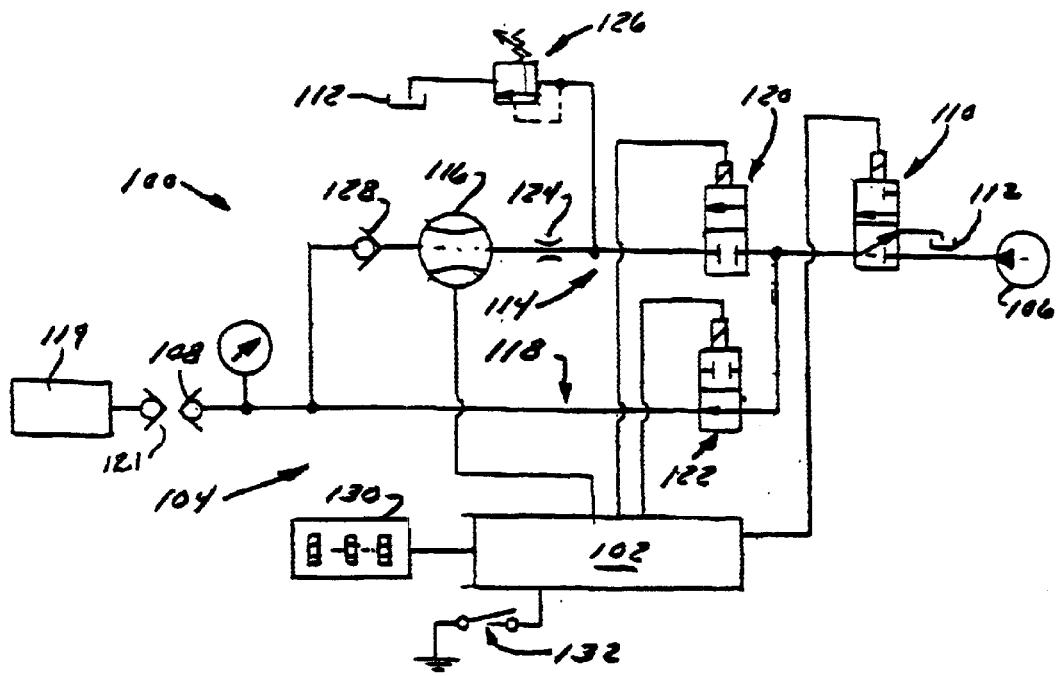
FIG. 1 illustrates a first embodiment of the invention in which two alternative flow paths are provided between a pressure source and a hydraulic component to be tested, one path providing a high flow rate that is used initially to purge the hydraulic component at a rapid rate, and the other path providing a much lower flow rate that also includes a leakage flow rate measuring device to indicate the leakage flow through the hydraulic component.

FIG. 1 shows a first embodiment of the test stand 100 including an electronic controller 102 coupled to a hydraulic circuit 104. Hydraulic circuit 104 conducts fluid from a source of hydraulic fluid under pressure 106 and a coupler 108 of the quick connect variety. It is configured to mate with a port on the hydraulic component 119 (typically a valve) being tested via mating coupler 121, which is connected to component 119.

There are three electrically-actuated valves in the hydraulic circuit, including a first valve 110 that is coupled to source 106 and tank 112 as well as the remainder of the hydraulic circuit. Valve 110 connects to hydraulic circuit 104 either to pressure source 106 or to tank 112. Fluid from hydraulic pressure source 106 is conducted through first valve 110 and into one of two flow paths or circuits that extend between pressure source 106 and coupling 108. One hydraulic circuit or path 114 conducts fluid through a hydraulic fluid leakage flow measuring device 116 and thence to coupling 108. The other path 118 conducts fluid from high-pressure source 106 to coupling 108 but bypasses measuring device 116. Circuit 118 is used to fast fill and purge the hydraulic component under test that is fluidly connected to hydraulic coupling 108. Hydraulic circuit 114 is used once the hydraulic component 119 has been purged and filled with hydraulic fluid to conduct a leakage flow of hydraulic fluid through flow measuring device 116 and into the hydraulic component from pressure source 106.

Flow through parallel circuits 114 and 118 is controlled by valves 120 and 122. Valve 120 is disposed between hydraulic pressure source 106 and flow measuring device 116 in circuit 114 to permit or prevent fluid flow through measuring device 116 thereby protecting device 116 from excessive flows.

Similarly, valve 122 permits or prevents flow through circuit 118, which bypasses device 116 and provides a much greater flow of fluid to hydraulic component 119 to initially purge it and fill it. Hydraulic circuit 114 includes an orifice 124 disposed in the hydraulic line between high-pressure source 106 and device 116 to limit the fluid flow rate to the measuring device. This provides an additional safety factor in case one or more of the valves fail. In addition, a relief valve 126 is disposed in hydraulic circuit or path 114 between hydraulic pressure source 106 and measuring device 116 to limit the maximum pressure applied to measuring device 116. When the pressure setting of relief valve 126 is reached, relief valve 126 opens and dumps hydraulic fluid to tank 112 to which it is also coupled. It remains open until the over-pressure condition no longer exists at which time it closes. It also is in the nature of a safety device to protect flow measuring device 116. A check valve 128 is disposed in hydraulic circuit 114 between measuring device 116 and coupling 108 to prevent the backflow of fluid to this circuit and the creation of air bubbles.

Valves 110, 120, 122, and device 116 are coupled to electronic controller 102. Controller 102 monitors the signal generated by device 116 and displays a value indicative of the leakage flow rate on display 130 to which it is coupled. Electronic controller 102 also drives the electrical solenoids on the valves that open and close valves 110, 120, and 122. While these valves can be manually operated, it is preferable that they be connected to an electronic controller that can sequence their operation repeatably thereby providing more accurate and more precise test conditions for each successive hydraulic component that is connected to and tested by the system. A manually-operated electrical switch 132 is also coupled to electronic controller 102. Switch 132 is operated by the person performing the test to indicate to electronic controller 102 that a hydraulic component to be tested is properly connected to coupling 108 and the testing process can now begin.

Electronic controller 102 is preferably a microprocessor-based device such as a programmable logic controller (PLC). It has a central processing unit, RAM memory, ROM memory, and driver circuits configured to drive both display 130 and the solenoids of valves 110, 120, and 122. Its memory circuit stores a sequence of digital instructions that sequentially operate each of the valves and the display to test each hydraulic component connected to coupling 108.

In an alternative and simpler embodiment, electronic circuit 102 is comprised of several timing relays that open and close the valves shown in FIG. 1. In this embodiment, the time delays are provided not by a program stored in memory, but by the adjustment of the relay time delays.

The testing process begins with the operator connecting the hydraulic component under test to coupling 108. Once connected, the operator presses switch 132. The switch then sends an electrical signal to electronic controller 102. In response to this signal, electronic controller 102 energizes first valve 110. When this valve is energized, it shifts from its normal position shown in FIG. 1 to its second position in which hydraulic fluid from source 106 is connected to circuit 104. Since valve 122 is normally open permitting fluid to pass through circuit or path 118, energizing valve 110 causes hydraulic fluid from source 106 to travel through circuit 118, into coupling 108, and thence into the hydraulic component being tested. Circuit 118 is configured to provide a flow rate therethrough that is at least twice as great as the flow rate through circuit or path 114. Electronic controller 102 is preferably also configured to maintain this state for a predetermined time of between two and ten seconds. This predetermined time interval is selected such that all hydraulic components of a particular design that are tested by the system will be completely purged of air and filled with hydraulic fluid. The benefit in using a predetermined time interval does not change as that of repeatability. All hydraulic components of a particular type that are tested by the test stand will have been connected to a source of hydraulic fluid for purging for the same amount of time.

After this initial time interval, which can vary depending on the type of component that is being tested, electronic controller 102 energizes valves 120 and 122. When valve 120 is energized, fluid flow at the higher flow rate through the bypass circuit or path 118 is blocked and fluid flow through the measuring circuit or path 114 is permitted or enabled. Again, the flow rate through circuit 114 is less than the flow rate through circuit 118. Typically the flow rate through the bypass or filling circuit 118 is at least twice as large as the flow rate through the measuring or leakage circuit 114. More preferably it is at least five times as great. These comparative flow rates are measured with the same head pressure provided by the source.

With the hydraulic component completely purged and filled with hydraulic fluid, any flow through circuit 114 is the leakage flow rate through the hydraulic component.

Once valves 120 and 122 are energized, electronic controller 102 monitors the electrical signal from measuring device 116, converts it to a numeric value indicative of the leakage flow rate and transmits a corresponding signal to display 130. Display 130, in response to receiving the signal will display a numeric value indicative of the volumetric leakage flow rate through the hydraulic component being tested.

Electronic controller 102 maintains this state for a second predetermined time interval preferably between one and seven seconds. More preferably this interval is between two and five seconds. This second time interval has a length sufficient to permit measuring device 116 to "settle down" and provide an accurate measurement of the hydraulic leakage flow rate through the hydraulic component under test. Once this time interval is over, electronic controller 102 returns the system to its initial state by de-energizing valves 110, 120 and 122. By de-energizing valve 110, fluid flow from pressure source 106 is blocked from passing through circuit 104. Valve 110 also depressurizes hydraulic testing circuit 104. When valve 110 is de-energized, it connects hydraulic circuit 104 to tank 112. Since tank 112 is at or near atmospheric pressure, this relieves the pressure on coupling 108 and permits the operator to remove coupling 108 from the hydraulic component more easily and with less fluid spillage.

Once the operator has removed coupling 108 from the hydraulic component under test, the entire cycle of operation can begin again with a new hydraulic component.

In the system of FIG. 1, electronic controller 102 operates the valves. Electronic controller 102 could be removed, however, and the electronic valves 110, 120, and 122 replaced with manually-actuated valves. In a system such as this, the operator of the test stand would be obliged to manually open and close each of the valves in order to test each hydraulic component.

While measuring device 116 as shown in FIG. 1 is an electromechanical device, it can also be a mechanical measuring instrument. For example, a small double-acting cylinder can be coupled between the two hydraulic lines that are otherwise connected to device 116. In such an arrangement, as leakage flow passes into one port of the double acting cylinder, the same volume of fluid is forced out through the other port of the cylinder and thence into coupling 108 and the hydraulic component. The distance that the cylinder's rod and piston are shifted is proportional to the volume of fluid that has flowed through the cylinder. This volume, proportional to the movement of the piston rod, can be divided by the amount of time required to move the piston rod. This ratio is equivalent to the volumetric flow rate of hydraulic fluid leakage flow. Thus, one can determine the leakage flow rate with a purely mechanical device.

Figure 2:
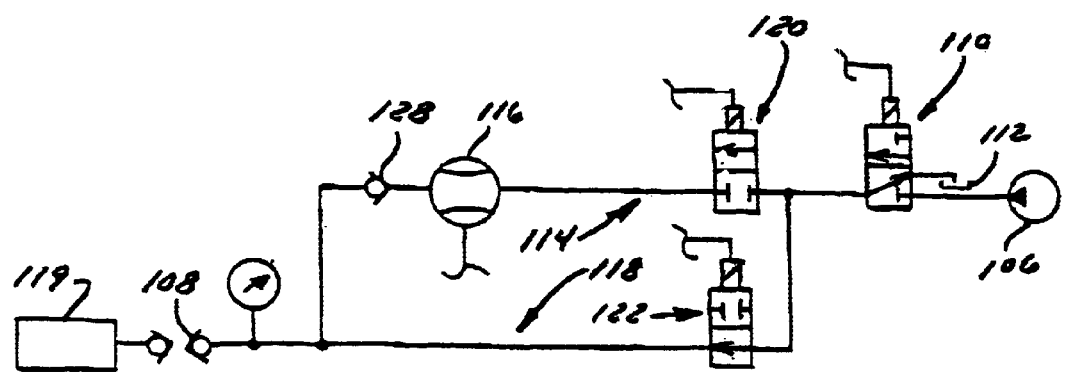
FIG. 2 illustrates an alternative embodiment of the hydraulic circuitry of the test stand of FIG. 1 in which an orifice used to limit flow rate through the measuring device has been removed and a relief valve to limit pressure to the measuring device has been removed.

FIG. 2 shows an alternative arrangement of hydraulic circuit 104 (controller 102 and its interconnections have been removed for convenience) as circuit 104'. In this system, both relief valve 126 and orifice 124 have been removed from circuit 114 (now 114') to provide an uninterrupted flow path between valve 120 and measuring device 116. Since orifice 124 and relief valve 126 are only required as protection devices for measuring devices 116, it is possible to eliminate them if measuring device 116 is suitably robust. In all other respects, the system of FIG. 2 is the same as system of FIG. 1.

In both the preceding figures, FIG. 1 and FIG. 2, the hydraulic circuitry was configured to dump any residual pressure in the system back to tank 112 via valve 110. One drawback of this arrangement is that all hydraulic fluid flow through hydraulic circuit 104 is terminated whenever test stand 100 is not actively being used to conduct fluid into the hydraulic component for testing. One of the drawbacks of this system, especially when there are extended periods between the testing of successive hydraulic components, is that the hydraulic components of hydraulic circuit 104 are permitted to cool. When precise measurements are being made, this cooling, and the inevitable changing of hydraulic fluid viscosity, and expanding and contracting of elements in circuit 104, can introduce error into leakage flow rate measurements. Furthermore, if the temperature of the hydraulic fluid introduced into each hydraulic component under test varies (as it would if the system is allowed to cool and sometimes not) the test conditions will not be the same from measurement to measurement. For these reasons, an arrangement such as that disclosed in FIG. 3 may be beneficial in maintaining hydraulic circuit 104 at a relatively constant temperature.

Figure 3:
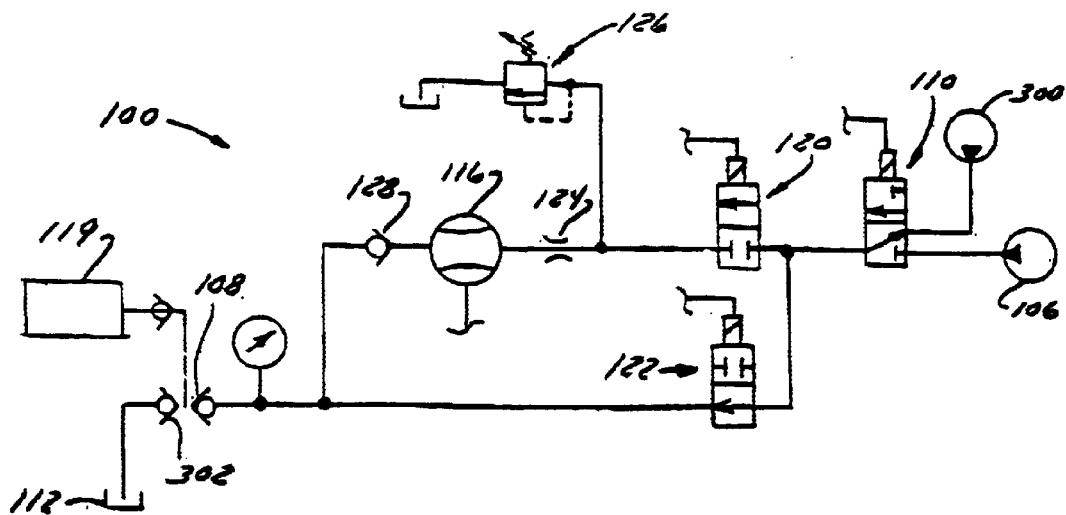
FIG. 3 illustrates an alternative embodiment of the system of FIG. 1 in which two sources of hydraulic fluid under pressure are provided, a first source of high pressure used for initial purging and leakage rate measurement, and a second source at a much lower pressure used to keep the test stand warm during periods in which no leakage flow testing is being performed.

In FIG. 1, hydraulic fluid in hydraulic circuit 104 was returned via valve 110 to hydraulic tank 112. This condition exists whenever the system is not actively filling a hydraulic component under test. In contrast to that, the system of FIG. 3 provides a low flow rate low-pressure hydraulic fluid flow through circuit 104 when test stand 100 is not actively testing any hydraulic component. As in the example of FIG. 2, electronic controller 102 and its associated components have been removed for clarity of illustration. Nonetheless, as in FIG. 2, they are a part of the system and are connected to valves 100, 120, 122 and measuring device 116 in the manner illustrated in FIG. 1.

In FIG. 3, the connection to tank 112 at valve 110 has been replaced with a low flow rate low-pressure warm hydraulic fluid source 300. In addition, another coupling 302 is provided for test stand 100 that connects to tank 112.

Whenever electronic controller 102 finishes a testing cycle, and de-energizes valve 110, source 300 is connected to hydraulic circuit 104. The pressure in circuit 104 immediately drops to the pressure generated by low-pressure source 300. At this point, the operator can remove coupling 108 from the hydraulic component being tested and immediately connect coupling 108 to coupling 302 on the test stand, as shown in FIG. 3. In this configuration, hydraulic fluid from warm fluid source 300 can pass through hydraulic circuit 104 and through coupling 108 thus keeping both the hydraulic fluid in the circuit and the circuit itself warm to a constant operating temperature.

When the operator decides to check the next hydraulic component for leakage, he merely removes coupling 108 from coupling 302 on test stand 100, connects coupling 108 to coupling 121 which is in fluid communication with the hydraulic component 119 to be tested, and presses switch 132 to begin the testing process. To provide additional temperature control for hydraulic circuit 104, electronic controller 102 can also be configured to energize valve 120 during non-testing periods. When valve 120 is energized, it permits fluid flow through hydraulic circuit or path 114 and thus keeps measuring device 116 warm during non-testing periods as well.

Figure 4:
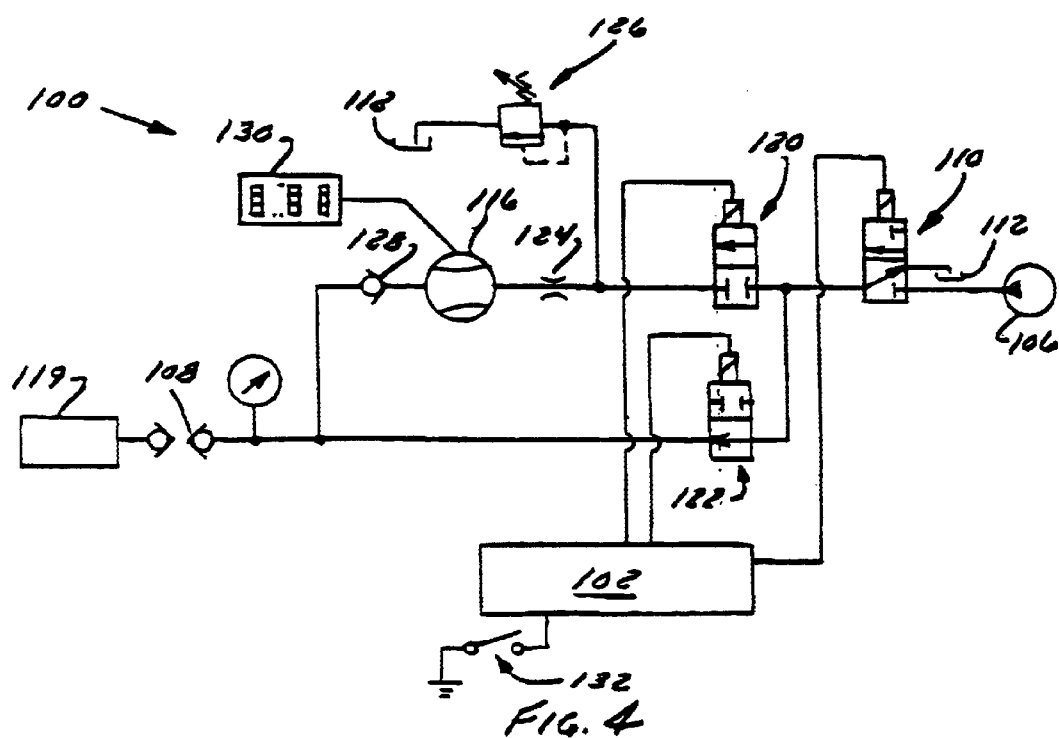
FIG. 4 is an alternative embodiment of the system shown in FIG. 1, in which the electronic display 130 is directly coupled to the leakage flow rate measuring device 116 and the electronic controller 102 sequences the valves to which it is coupled based on predetermined on the off times, and not on particular pressure signals from flow rate measuring device 116.

FIG. 4 illustrates an alternative embodiment in which the electronic display 130 is coupled directly to flow measuring device 116, which includes circuitry to drive the display. In this embodiment, the operator presses switch 132, which causes electronic controller 102 to cycle through the valve-opening and valve-closing steps identified above in conjunction with the foregoing FIGURES. The operator reads the display and determines whether or not the component has passed or failed the leakage flow test. In FIG. 4, electronic controller 102 preferably energizes valve 122 for an initial predetermined fill period of at least 5 seconds (more preferably 10 seconds) before closing valve 122 and opening valve 120 to permit flow through flow measuring device 116. In its simplest form, controller 102 is preferably embodied as a combination of time delay relays to provide this predetermined fill period.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims.

What is claimed is:

1. A method of testing a high pressure hydraulic component for leakage flows using a test stand that does not employ an internal pressurizing/pressure-maintaining pump, the test stand including
   (1) a measuring circuit that fluidly couples a source of hydraulic fluid under approximately 1,000 pounds per square inch of pressure and a hydraulic coupler through a fluid flow rate measuring device, and (2) a bypass circuit that fluidly couples the source and the coupler and bypasses the measuring device, wherein the bypass circuit is configured to be opened and closed to thereby permit fluid flow and to block fluid flow, the method comprising the steps of:
   connecting the hydraulic component to be tested to the coupler;
   filling the hydraulic component with hydraulic fluid from the source of pressurized hydraulic fluid through the bypass circuit and the coupling at a filling flow rate of hydraulic fluid flow, the flow rate through the bypass circuit being at least five times the flow rate through the measuring circuit;
   blocking hydraulic fluid flow through the measuring circuit during the step of filling;
   blocking flow through the bypass circuit into the hydraulic component once the hydraulic component has been filled;
   providing the hydraulic component with hydraulic fluid from the source through a measuring circuit that includes a measuring device configured to measure a leakage flow rate at which hydraulic fluid leaks through the hydraulic component, wherein the leakage flow rate is less than half the filling rate; and
   measuring the leakage flow rate at some time during the step of providing hydraulic fluid through the measuring circuit.

2. The method of claim 1, wherein the step of measuring a flow rate includes the steps of:
   generating an electrical signal in the measuring device indicative of the leakage flow rate therethrough; and
   electronically displaying a value indicative of the leakage flow rate therethrough.

3. The method of claim 1, wherein the test stand includes a first valve disposed in the bypass circuit to block flow therethrough and further wherein the step of blocking flow through the bypass circuit includes the step of closing the first valve.

4. The method of claim 3, wherein the test stand includes a second valve disposed in the measuring circuit to block flow through the measuring device and further wherein the step of blocking hydraulic fluid flow through the measuring circuit includes the step of closing the second valve.

5. The method of claim 3, wherein the first and second valves are operated by an electronic controller that includes a stored digital program including digital instructions to open and close the first and second valves in the appropriate sequence.

* * * * *